United States Patent

Stasi et al.

[11] Patent Number: 5,985,445
[45] Date of Patent: Nov. 16, 1999

[54] ANTIFRAGMENTATION PLATES OF POLYMETHYLMETHACRYLATE

[75] Inventors: Alberto Luca Stasi, Rho; Marco Binaghi, Milan; Donato Stanco, Barbaiana, all of Italy

[73] Assignee: Atohaas Holding C.V., Milan, Italy

[21] Appl. No.: 08/740,611

[22] Filed: Oct. 31, 1996

[30] Foreign Application Priority Data

Nov. 2, 1995 [IT] Italy .................. MI95A2267
Aug. 28, 1996 [IT] Italy .................. MI96A1794

[51] Int. Cl.⁶ ........................................ D02G 3/00
[52] U.S. Cl. .................. 428/361; 52/789.1; 52/307; 52/308; 52/309.1
[58] Field of Search ............. 428/288, 290, 428/360, 361; 548/547; 560/160; 54/789, 309.7, 309.1

[56] References Cited

U.S. PATENT DOCUMENTS 4,301,264  11/1981  Moore et al. .
4,360,632  11/1982  Pinschmidt, Jr. et al. .
5,415,926   5/1995  Leighton et al. .
5,576,384  11/1996  Nolken et al. .

FOREIGN PATENT DOCUMENTS 003957  9/1979  European Pat. Off. .
327006  8/1989  European Pat. Off. .
612718  8/1994  European Pat. Off. .

OTHER PUBLICATIONS

European Search Report dated Jan. 20, 1997.

*Primary Examiner*—Merrick Dixon
*Attorney, Agent, or Firm*—Bell, Boyd & Lloyd

[57] ABSTRACT

Antinoise and antifragmentation plates based on acrylic polymers employing a polymeric continuous film placed inside the plate, wherein the film is characterized by an elastic modulus lower than the one of PMMA of at least 30%, and/or elongtion at break higher than at least 40%, measured by the test according to ISO 527 standard for plates or for films.

17 Claims, No Drawings

ANTIFRAGMENTATION PLATES OF POLYMETHYLMETHACRYLATE

The priority document described in the claim for priority is hereby incorporated by reference.

FIELD OF THE INVENTION

The present invention relates to plates based on acrylic polymers to be used as barriers having antinoise and antifragmentation properties.

In particular it relates to transparent polymethylmethacrylate plates with high thickness, of about 10–25 mm, preferably 15–20 mm, for motorway barriers, viaducts, bridges, etc.

BACK GROUND OF THE INVENTION

It is well known to utilize acrylic panels rather than other materials in the construction of antinoise barriers to be utilized in motorway.

The technical problem arises when a blunt instrument crashes into the panel thus determining the formation of fragments falling in the road area.

The same problem arises in case of viaducts and bridges causing danger situations for what lies under these structures.

It is known to build protective barriers against this fragmentation by means of nets wrapping the panel. However the net meshes must have wide sizes otherwise the panel does not show any more transparence phenomena, necessary for the practical applications of these panels. The alternative utilized in practice consists in employing nets with large meshes to allow a certain transparence. The drawback of this technical solution consists in that the antifragmentation effect of the net results in this way very diminished. Moreover, to maintain a certain transparence the panels must be subject to very frequent cleaning operations since nets favour the accumulation of substances lowering the transparence, for instance dust, leaves, etc. This requires the taking down of nets with the consequent increase of maintenance costs.

The same drawbacks, as regards the transparence, occur also when the nets are inserted into the panel, even if the cleaning operation described above is in this way eliminated.

From U.S. Pat. No. 5,040,352 transparent antifragmentation panels based on acrylic resins containing threads, fibers, bands or nets in plastic material, approximately in the middle of the panel, are known. In particular the materials indicated as suitable for reinforcing acrylic panels are monofilaments of polyamide or polypropylene because of their poor adhesion to the acrylic glass.

The preferred sizes for monofilaments are 0.2–2 mm of diameter. The preferred sizes for plastic bands which can be formed by films or fibers have a width from 5 to 25 mm and a thickness from 0.2 to 2 mm.

The distance among filaments or bands must be in the range between 10 and 100 mm.

The advantage of these plastic materials inserted about in the middle of the panel consists in that they are transparent and therefore avoid problems of diminished transparence with respect to the art and avoid the cleaning operations due to the environmental pollution since they are inside the panel. The antifragmentation properties are good.

DESCRIPTION OF THE INVENTION

The Applicant has unexpectedly and surprisingly found that it is possible to prepare antinoise and antifragmentation plates based on acrylic polymers by employing one or more polymeric continuous films placed inside the panel, wherein the films are characterised by an elastic modulus lower than the PMMA's one of at least 30%, and/or elongation at break higher than 40%, preferably of at least 60% measured by the test according to ISO 527 standard for plates, or films.

If only one film is utilized, the film can be put in the middle of the panel, preferably it is placed nearer the tensile part during the crash. In practice the film is preferably placed at about 70–95% of the total thickness of the plate in the opposite part of the surface subject to crash. In other words, the film is put at a distance preferably comprised between 5 and 30% of the total thickness of the plate with respect to the surface opposite to the surface subject to crash. It is also possible to carry out the plate with two insertions of films put near both PMMA faces.

The film has generally a thickness from 70 $\mu$m up to 6 mm, preferably from 90 $\mu$m to 5 mm.

According to another embodiment of the invention, as already said, also 2 or more films inserted in the PMMA can be used. This embodiment is industrially preferable since it allows to carry out multilayer structures with film thicknesses towards the lower limit of the range indicated above. In multilayer structures the film thickness is generally of the order of 500 micron up to 2 mm.

The preferred polymers are transparent polyalkylenterephthalates with the alkyl from 2 to 5 carbon atoms, for instance polyethylenterephthalate (PET), polybutylenterephthalate (PBT); polyvinylbutyral (PVB), transparent elastomers having an acrylic basis, transparent thermoplastic elastomers having a styrene basis, such as for instance styrene/butadiene block copolymers, transparent copolymers with a styrene basis MBS type.

These polymers can be used alone or in admixture with each other or with other polymers, for instance PMMA, MMA/styrene in such ratios as to maintain the transparence and the elongation and modulus features as defined above.

As elastomers having an acrylic basis it can be utilized both homopolymers, for instance polybutyl(meth)acrylate, MMA butylacrylate and copolymers with even complex structures such as core-shell, having one or more layers, similar to those generally used in impact resistant PMMA. As example of elastomeric products with an acrylic basis see U.S. Pat. No. 5,183,851, U.S. Pat. No. 3,793,402, U.S. Pat. Nos. 3,808,180 and 4,180,529, herein incorporated for reference.

In case of poor adhesion it can be improved with the employment of suitable transparent bonding agents such that the final composite is transparent. For instance in case of PET and PBT, the bonding agents commercialized by films suppliers are used. Bonding agents based on acrylate, butadiene, chloroprene, nitrile, butene, etc., obviously selected depending on the chemical nature of the intermediate film, can generally be used.

For the elastomers with an acrylic basis or a styrene basis, the compatibility with PMMA is generally sufficient in itself to assure a good adhesion.

The preferred polymers to obtain the films of the invention are the following:

The preferred polymers are PET; and the styrene/butadiene block copolymers. The latter are in trade as K RESIN, in particular K RESIN 03, 04, 05, KK38, etc. of Phillips Petroleum. Among styrene polymers, MBS terpolymer methyl-methacrylate-butadiene-styrene can also be mentioned.

With the preferred polymers a uniform film with good adhesion to the acrylic basis is obtained, in case of PET by utilizing the suitable known bonding agents, with the K RESIN bonding agents are not required for the reasons indicated above.

Another preferred film to be utilized as inner layer between two PMMA plates comprises the following essential components:

(a) selected from the following components
   (a1) alkyl(meth)acrylate monomers having the general formula:

$$CH_2=C(R_0''')-C(=O)-R_{01}$$

wherein
   R''' can be H, $CH_3$
   $R_{01}$ can be an alkyl from 1 to 10 carbon atoms, linear or branched when possible, preferably a linear alkylic chain, preferably from 1 to 6 carbon atoms, or a cycloalkyl alkyl from 5 to 15 carbon atoms, optionally containing heteroatoms, for instance cyclopenthyl or cyclohexyl;

(a2) aliphatic urethane oligomers di (tri) (meth)acrylates obtainable by reaction of a polyisocyanate, preferably di(tri)isocyanate having the general formula:

$$R'-(NCO)_q$$

wherein R' is an aliphatic chain from 1 to 10 carbon atoms, preferably from 2 to 6, or an (alkyl)-cycloaliphatic chain wherein the alkyl has the meaning described above and the cycloalkyl is a cyclic ring from 3 to 6 carbon atoms, preferably 5–6, q being an integer from 2 to 6, preferably from 2 to 3, with dialcohols of general formula:

$$HO-R''-OH$$

wherein R'' has the same meaning as R'; said prepolymer NCO or OH terminated is reacted with (meth) acrylic acid to obtain unsaturated terminations;

(a1) and (a2) can be also in admixture among each other, the amount of (a2) ranging from 20 to 80% by weight with respect to (a1), preferably between 20–40% by weight;

(b) selected among one or more of the following components
   (b1) polyalkylglycols di-poly-(meth)acrylates having the general formula:

$$CH_2=C(R_0)-C(=O)-O(CH(R''')-CH_2-O)_m-C(=O)-C(R_0)=CH_2$$

wherein
   $R_0$ is equal to H, $CH_3$,
   R''' is equal to H, alkyl from 1 to 6 carbon atoms, preferably 1,
   m is an integer from 2 to 12, preferably from 3 to 10;

(b2) alkyl di-poly-(meth)acrylates having the general formula:

$$CH_2=C(R_0)-C(=O)-O(CH_2)_{n'}O-C(=O)-C(R_0)=CH_2$$

wherein
   $R_0$ is equal to H, $CH_3$,
   n' is an integer from 2 to 10, preferably from 4 to 6;

(b3) polyallylglycidylethers having the general formula:

$$CH_2=CH-CH_2-(O-CH_2-CH(OR_{0'})-CH_2-O)_{n''}-(CH_2)_{m'}-(O-CH_2-CH(OR_{0'})-CH_2-O)_{n''}-CH_2-CH=CH_2$$

wherein
   n'' is an integer from 1 to 8, preferably from 3 to 6;
   m' is an integer from 2 to 10, preferably from 2 to 6,
   $R_{0'}$ is equal to H or an alkyl from 1 to 10 carbon atoms, preferably from 1 to 6;

the mixture of (a) and (b) is such as to have a viscosity from 50 to 3,000 Poises, preferably from 100 to 1,000; the component (b) can be omitted if in the formulation the component (a2) is present;

(c) alkyl(meth)acrylate of hydroxy or carboxy alkyls from 2 to 6 carbon atoms, in amounts comprised between 0.5 and 5% by weight on the total, preferably 0.5–2, having the general formula:

$$CH_2=C(R_0)-C(=O)-R_{02}$$

wherein
   $R_0$ is H or $CH_3$,
   $R_{02}$ is an alkyl from 1 to 10 carbon atoms, preferably from 1 to 6;
   the amount of component (b) in the composition being comprised between 5 and 20% by weight, preferably between 5 and 10% by weight;
   the film being obtained by UV polymerization in the presence of photoinitiators in amounts comprised between 0.1 and 10% by weight, preferably between 0.5 and 5% by weight;
   the amount of (a) being the complement to 100.

The components of type (a2) are commercially known for instance as EB®: such as EB 230, EB 264, EB 284, EB 244 produced by the company UCB.

The components of type (a1) are for instance methyl-, ethyl-, butyl-, isobutyl-, ethyl-hexyl acrylate, etc.

The compounds (b1) are these too known commercially as: SARTOMER® 252, SARTOMER® 400, commercialized by Cray valley, or tripropylenglycoldiacrylate (TPGDA); compounds (b2) are well known, hexandioldiacrylate (HDDA) can be mentioned; compounds (b3) are known in trade as SANTOLINK® XI 100 commercialized by Monsanto.

Compounds (c) which can be mentioned are hydroxyethyl- and hydroxypropyl-acrylates or methacrylates; alpha-hydroxy-ethyl(meth)acrylate, carboxyethyl (meth)acrylate, for instance 2-carboxyethyl(meth)acrylate, are preferred.

As polymerization photoinitiators of radical type, induced by ultraviolet light one can mention those based on benzophenone such as ESACURE® KT 37 and UVECRYL® P115 by Lamberti, or such as IRGACURE® 500 by Ciba-Geigy. DAROCUR® 1173 and the other compounds indicated in EP patent 374,516 can also be utilized; alkylic or aromatic peroxides and/or hydroperoxides, for instance benzoylperoxide, ter-butylhydroperoxide, laurylperoxide, lauroylperoxide, cumylhydroperoxide, etc. can also be utilized. The amount of radicalic photoinitiators as said above ranges from 0.5 to 5% by weight, preferably from. 0.5 to 2% by weight.

The industrially preferred process for preparing antifragmentation panels with the film described above by its components (a) (b) and (c) is the following: two PMMA (cast or extruded) plates are taken, are superimposed by interposing at the borders of the plates a biadhesive tape, for instance the product commecialized by 3M as VH®, having a thickness of some millimeter, in order to form an interspace of the same sizes of the plates and thickness of the tape, taking care however of leaving one or more openings depending on the plates sizes, to allow the filling of the interspace with the the UV polymerizable resin of the invention. The amount of resin is determined considering besides the volume of the interspace also the dimensional shrinkage of the Composition of the invention during the polymerization phase. The so obtained panel is inserted inside an oven equipped with UVA lamps and kept therein for the time necessary to polymerization. Since this kind of lamps does not give rise to a strong increase of the temperature of the panel under preparation, the possible stresses of the panel which could compromise the properties thereof, are thus avoided.

Crosslinking besides the radicalic photoinitiators indicated above can be also of mixed type of radicalic and cationic photoinitiators. Cationic initiators of polymerization and crosslinking at the UV light are well known in the art, for instance triarylsulphonium salts, such as hexafluoroantimonates of triarylsulphonium (UVI-6974-CYRACURE®, Union Carbide) and hexafluorophosphates of triarylsulphonium (UVI-6990-CYRACURE®, Union Carbide), can be mentioned.

Such cationic photoinitiators are not inhibited by the oxygen and are employed in combination with radicalic photoinitiators preferably in a weight ratio between radicalic/cationic photoinitiator of at least 2/1, more preferably of 3/1. By employing such ratios it is possible to obtain the resin crosslinking in an air room with relative humidity up to 60%.

The cationic photoinitiator amount generally ranges from 0.01 to 3% by weight, preferably from 0.2 to 0.6.

The crosslinked resin as indicated above leads to products of rubbery nature with the characteristics indicated above.

Crosslinking with radicalic photoinitiators is generally carried out for times comprised between 30 sec-30 min depending on the lamp power, the distance between the panel and the lamp, generally depending on the radiant power really reaching the panel containing the resin to be polymerized.

The panels with an acrylic basis containing antifragmentation polymers can be obtained by compression molding, by casting, by coextrusion or by sizing.

By coextrusion it is particularly preferred to utilize styrene-butadiene block copolymers, for instance K RESIN® indicated above.

The panels with the film according to the present invention must be resistant to a minimum impact energy such as to cause the breaking of the plates according to the tests described in the examples. The antifragmentation tests are positive if fragments are kept together after the plate breaking.

It is thus determined if the panel breaks without causing fragments, that is, if the fragments are kept by the film.

For polymers having an acrylic basis according to the present invention are meant MMA homopolymers, MMA copolymers with other comonomers such as ethyl(meth) acrylate, butyl(meth)acrylate in low concentrations. The amounts of comonomer are generally up to 10% by weight. MMA homopolymers or copolymers can be obtained by polymerization according to usual techniques, for instance by polymerization in mass or in suspension. The molecular weight can be adjusted by addition of suitable chain transfer agents, for instance of the mercaptanes class. The weight average molecular weights $M_w$ can generally be comprised in the range of 50,000–2,000,000.

The lowest values of molecular weight are preferred for the production of plates by co(extrusion) ; the highest ones in case of preparation of plates by casting.

EXAMPLES

The following examples are given only for illustrative purpose but are not limitative of the present invention.

EXAMPLE 1

Preparation of the Panel with the Film

A three-layer 250×250 mm plate (thickness 15 mm) is obtained by compression molding of two external plates of PMMA copolymer as specified below (thickness 8 and 5 mm) with an internal plate of a styrene/butadiene block copolymer (thickness 4 mm) of Phillips Petroleum K RESIN 04.

Preparation of the Plate

The two PMMA copolymer plates (MMA/ethylacrylate) are prepared by compression molding according to the following procedure:

PMMA copolymer Altuglas® 9E of ATOHAAS in granules with elastic modulus of about 3200 MPa and elongation at break lower than 6%;

molding temperature: 180° C. and idraulic pressure of the piston 210 kg/cm (Compression Molding Equipment POTVEL® 60)

The styrene/butadiene copolymer plate is obtained from granules by compression molding according to the following procedure:

styrene/butadiene copolymer K RESIN 04 of Phillios Petroleum having bending modulus lower than 2000 MPa;

molding temperature 160° C. and idraulic pressure of the piston 200 kg/cm$^2$ (Compression Molding Equipment POTVEL® 60).

The three-layer plate is obtained by further compression molding with molds having a thickness of 15 mm of the three plates with the PMMA copolymer outside according to the following procedure:

2 plates of PMMA copolymer and 1 plate of styrene/butadiene copolymer molding temperature: 180° C., idraulic pressure or the piston 200 kg/cm² (Compression Molding Equipment POTVEL®

Antifragmentation Tests

Impact tests

Weight falling mass: (with steel spheric punch with a diameter of 50 mm) 4.0 kg on the middle of the plate; fall height: 2.1 m; impact energy: 82 Joule.

The plate is put on a rigid square support having sides of 255 mm, with a support frame of 8 mm.

The three-layer plate is put on the support with the layer of PMMA copolymer with a thickness initially of 5 mm in tensile stress.

The plate breaks and shows surfaces of fracture propagation. The plate breaks up but fragments remain perfectly together.

EXAMPLE 1A

Comparative

Example 1 was repeated but using a PMMA copolymer plate as such having a thickness of 15 mm, without the internal film of styrene/butadiene copolymer and submitted to the same impact test. It breaks causing numerous fragments.

EXAMPLE 1B

Example 1 was repeated but using PMMA copolymer plates obtained by extrusion of Altuglas® 9EL in pearls. The three layer plate is prepared and submitted to crash exactly as reported in example 1.

The composite formed by the three plates shows good antifragmentation properties similar to the ones of Example 1.

EXAMPLE 1C

A 125×125 mm sample obtained by a plate described in example 1 is tested according to the following procedure: the sample is put in the middle of a support having an opening in the middle with a diameter of 90 mm. An weight of 15.5 kg having an hemishperic punch with a diameter of 20 mm is let -fall on the middle of the sample from an height of 200 cm such that the impact rate is of about 2 m/sec.

After crash the plate shows a star-shaped fracture but the PMMA fragments are quite kept together by the film interposed between the two acrylic plates.

EXAMPLE 2

Preparation

A three-layer 250×250 mm plate (thickness 15 mm) is obtained by compression molding of two external plates of PMMA copolymer Altuglas® 9E of Example 1 (thickness 8 and 5 mm) and with internal plate having a thickness of 4 mm formed by a blend composed of a styrene/MMA block copolymer in amount (33% by weight) and styrene/butadiene block copolymer (67% by weight).

Preparation of the Plate

The two PMMA copolymer plates are prepared by compression molding according to the procedure reported in Example 1.

Preparation of the Material of the Intermediate Plate

The intermediate plate was obtained from granules of a blend of ZYLAR® 93456 manufactured by Novacor (containing 45% by weight of K RESIN 04) and of pure K RESIN 04 in ganules, with a total content of styrene/butadi.ene copolymer of 67% by weight, by compression molding at 170° C. and idraulic pressure of the piston of 200 kg/cm (the same apparatus of Ex. 1).

The final plate is obtained according to the same procedure of Example 1.

Antifragmentation Tests

The procedure of Example 1 was repeated for the impact tests. The plate broke but fragments remained perfectly together.

EXAMPLE 3

A three-layer 250×250 mm plate (thickness about 18 mm) is obtained by sizing of an external plate and a film of PMMA copolymer (thickness 17 and 1 mm) with PET internal film having a thickness of 70 micron.

Preparation of the Plate

The plate is obtained by sizing the PET film commercialized by 3M, having elongation >50%, to the PMMA copolymer plate. Successively the second plate of PMMA copolymer is sized by using a commercial cyanoacrylic adhesive. During the sizing operations care was taken to eliminate the air bubbles among the various layers by rolling.

Antifragmentation tests

The procedure of example 1 was repeated for the impact tests, but utilizing a weight of 3.8 kg and a fall height of 2.3 m (about 85 Joule) . The plate broke but the fragments remained perfectly together.

EXAMPLE 4

Preparation of the Resin to be Polymerized

The compounds of the resin of the invention (a) (b) and (c) are weighed in a dark glass flask, then it was heated below by rotating up to 40° C. in a ultrasonic thermostatic bath to obtain a perfect homogenization of the same.

The mixture thus obtained must be kept in dark glass containers in order to avoid the early polymerization of the The formulation of this example is the following:

| Formulation 1 | | |
| --- | --- | --- |
| parts by weight | (% by wt) | components |
| 65 | 64.2 | ethylacrylate |
| 10 | 9.8 | methylmethacrylate |
| 5 | 4.9 | 2-carboxyethylacrylate |
| 20 | 19.7 | EB-230 (UCB) |
| 1 | 0.98 | DAROCURE ® 1173 (Ciba) |
| 0,4 | 0.39 | UVI-6990 (Union Carbide) |

EXAMPLE 5

With the same process of Example 4 the following resin was prepared:

| Formulation 2 | | |
| --- | --- | --- |
| parts by weight | (% by wt) | components |
| 70 | 69 | ethylacrylate |
| 5 | 4.93 | methylmethacrylate |
| 5 | 4.93 | 2-carboxyethylacrylate |

-continued

Formulation 2

| parts by weight | (% by wt) | components |
|---|---|---|
| 20 | 19.7 | EB-244 (UCB) |
| 1 | 0.98 | DAROCURE ® 1173 (Ciba) |
| 0.4 | 0.39 | UVI-6990 (Union Carbide) |

EXAMPLE 6

With the same process of Example 4 the following resin was prepared:

Formulation 3

| parts by weight | (% by wt) | components |
|---|---|---|
| 65 | 64.1 | ethylacrylate |
| 15 | 14.8 | methylmethacrylate |
| 5 | 4.9 | 2-carboxyethylacrylate |
| 15 | 14.8 | C-252 (SARTOMER ® - Cray Valley) |
| 1 | 0.98 | DAROCURE ® 1173 (Ciba) |
| 0.4 | 0.39 | UVI-6990 (Union Carbide) |

EXAMPLE 7

With the same process of Example 4 the following resin prepared:

Formulation 4

| parts by weight | (% by wt) | components |
|---|---|---|
| 65 | 64.2 | butylacrylate |
| 10 | 9.8 | methylmethacrylate |
| 5 | 4.9 | 2-carboxyethylacrylate |
| 20 | 19.7 | SANTOLINK ® XI-100 (Monsanto) |
| 1 | 0.98 | DAROCURE ® 1173 (Ciba) |
| 0.4 | 0.39 | UVI-6990 (Union Carbide) |

EXAMPLE 8

Preparation of the Test Pieces for the Impact Tests

The preparation of antifragmentation panels was carried out as follows:

two PMMA plates obtained by casting are taken, which have 1000 mm×1100 mm sizes and a 8 mm thickness, not containing UV adsorber, are superimposed by interposing at the borders of the plates a biadhesive tape, (product commercialized by 3M VHB®), having a thickness of 1.5 mm, in order to form an interspace having the sime sizes of the plates and thickness of the tape, and leaving three openings for the air flow during the filling of the interspace with the the UV polymerizable resin of the invention having the composition indicated in example 1. The amount of the resin introduced is 1815 cc. During the filling phase care must be taken that air bubbles do not form which can optionally be removed by using a syringe through the biadhesive tape and/or by pressure on the PMMA plates. Once the filling of the interspace is over, the air flow holes are sealed. The so obtained panel is inserted inside an oven at room temperature equipped with 25 Watt/cm UVA lamps, maintained at a distance of about 20 cm from the panel, and kept therein for 15 min (time necessary for polymerization)

Antifragmentation Test

From the plate obtained with the method described above a sample having 620×620×17.5 mm is obtained.

The sample is put on a rigid square support having of 600×600 mm having a frame with a width of about 30 mm.

The panel is struck in the middle by a steel sphere having a diameter of 90 mm and a weight of about 3 kg fallen from an height of 6 meters.

After the crash the plate shows a star-shaped fracture but the PMMA fragments are quite kept together by the film interposed between the two acrylic plates.

The same test was repeated on 10 test pieces: some gave the fracture in the form of a star as indicated above, the others did not show any fracture phenomenon.

In any case when the plate breaks the pieces are kept together by the film interposed between the two acrylic plates.

EXAMPLE 9

One operates as in Example 8 for the preparation of the panel and for the antifragmentation test, but utilizing for the latter a steel sphere of about 4 kg and with a diameter of 100 mm.

The results of the antifragmentation test are similar to those of Example 8.

EXAMPLE 10

The same procedure of Example 8 for preparing the sample to be submitted to the antifrgmentation test is followed, but the sample is fixed by utilizing an upper frame having the same sizes of the lower frame with the use of two clamps on each side such that the clamping pressure is of 150 kN/m$^2$.

The results of the antifragmentation test are similar to those of example 8, in this case the plate showed a star-shaped fracture but the fragments were kept together by the film.

EXAMPLE 11

One operates as in example 8, but obtaining a sample of 250 mm×250 mm×17.5 mm. The sample is put on a square support having sides of 255 mm and a support frame with a width 10 mm. A punch with a steel sphere at the end, having a diameter of 50 mm for a total weight of 4 kg is let fall from a height of 2 m on the middle of the sample. The results of the antifragmentation test are similar to those of Example 8.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. Antinoise and antifragmentation plates comprising acrylic polymers employing at least one polymeric continuous film placed inside a plate having an elastic modulus lower than polymethylmethacrylate (PMMA) of at least 30%, and/or elongation at break greater than at least 40%.

2. Antinoise and antifragmentation plates based on acrylic polymers according to claim 1, wherein the film is placed about in the middle of the plate.

3. Antinoise and antifragmentation plates based on acrylic polymers according to claim 1, wherein the film is placed at a distance from 70 to 95% of the total thickness of the plate in the opposite side of a surface subject to crash.

4. Antinoise and antifragmentation plates based on acrylic polymers according to claim 1, wherein the plate contains two insertions of film put near both PMMA faces.

5. Antinoise and antifragmentation plates based on acrylic polymers according to claim 1, wherein the film has a thickness from 70 μm up to 6 mm.

6. Antinoise and antifragmentation plates based on acrylic polymers according to claim 1, wherein the film is based on polymers selected from the groups consisting of transparent polyalkylenterephthalates with the alkyl containing from 2 to 5 carbon atoms; polyvinylbutyral (PVB); transparent elastomers having an acrylic basis; and transparent thermoplastic elastomers having a styrene basis.

7. Antinoise and antifragmentation plates based on acrylic polymers according to claim 6, wherein the film is selected from the group consisting of polyethylenterephthalate (PET), polybutylenterephthalate (PBT); styrene/butadiene block copolymers; transparent copolymers having a styrene basis MBS type; elastomers having an acrylic basis selected from homo-polymers such as polybutyl(meth)acrylate, and copolymers having complex structures such as core-shell, having at least one layer.

8. Antinoise and antifragmentation plates having a thickness of 10–25 mm, based on acrylic polymers according to claim 1, wherein the film comprises the following essential components:
(a) selected from the following components:
(a1) alkyl(meth)acrylate monomers having the formula:

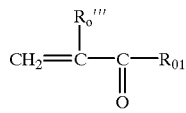

wherein
$R_0'''$ can be H, $CH_3$
$R_{01}$ can be an alkyl from 1 to 10 carbon atoms, linear or branched, a cycloalkyl alkyl containing from 5 to 15 carbon atoms, optionally containing heteroatoms,
(a2) aliphatic urethane oligomers di(tri) (meth) acrylates obtained by reaction of a polyisocyanate, having the formula:

$$R'-(NCO)_q$$

wherein R' is an aliphatic chain containing from 1 to 10 carbon atoms, an (alkyl)cycloalphatic chain wherein the alkyl has the meaning described above and the cycloalkyl is a cyclic ring containing from 3 to 6 carbon atoms, q being an integer from 2 to 6, with dialcohols of formula:

$$HO-R''-OH$$

wherein R" has the same meaning as R'; said prepolymer NCO or OH terminated is reacted with (meth)acrylic acid to obtain unsaturated terminations;
(a1) and (a2) can be also in admixture among each other, the amount of (a2) ranging from 20 to 80% by weight with respect to (a1), (b) selected from at least one of the following components:
(b1) polyalkylglycols di-poly-(meth)acrylates having the formula:

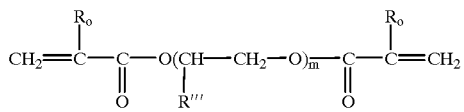

wherein $R_0$ is equal to H, $CH_3$,
R''' is equal to H, alkyl containing from 1 to 6 carbon atoms,
m is an integer from 2 to 12,
(b2) alkyl di-poly-(meth)acrylates having the formula:

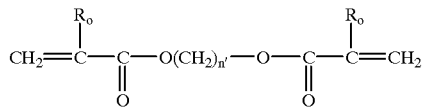

wherein $R_0$ is equal to H, $CH_3$,
n' is an integer from 2 to 10,
(b3) polyallylglycidylethers having the formula:

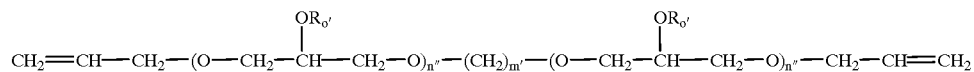

wherein
n" is an integer from 1 to 8,
m' is an integer from 2 to 10,
$R_{0'}$ is equal to H or an alkyl containing from 1 to 10 carbon atoms,
the mixture of (a) and (b) is such as to have a viscosity from 50 to 3,000 Poises,
the component (b) is optional if in the formulation the component (a2) is present;
(c) alkyl(meth)acrylate of hydroxy or carboxy alkyls containing from 2 to 6 carbon atoms, in amounts between 0.5 to 5% by weight on the total, having the formula:

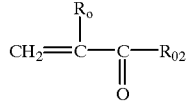

wherein
$R_0$ is H or $CH_3$,
$R_{02}$ is an alkyl from 1 to 10 carbon atoms,
the amount of component (b) in the composition being between 5 and 20% by weight, the film being obtained by UV polymerization in the presence of photoinitiators in the amounts between 0.1 and 10% by weight.

9. Antinoise and antifragmentaion plates based on acrylic polymers employing a polymeric continuous film according to claim 8 wherein the components of type (a1) are methyl-, ethyl-, butyl-, isobutyl-, ethyl-hexyl acrylate, the component (b1) is tripropylenglycoldiacrylate (TPGDA); compound (b2) is hexandioldiacrylate (HDDA) compounds (c) are selected from the group consisting of hydroxyethyl- and hydro-xypropyl-acrylates and methacrylates, carboxyethyl (meth)-acrylate.

10. Antinoise and antifragmentation plates based on acrylic polymers by using a polymeric continuous film according to claim 8, wherein the polymerization UV photoinitiators are of radicalic type and are selected from the group consisting of those based on benzophenone, alkylic or aromatic peroxides and hydroperoxides, the amount of radicalic photoinitiators as said above ranges from 0.5 to 5% by weight.

11. Antinoise and antifragmentation plates based on acrylic polymers by using a polymeric continuous film according to claim 10, wherein crosslinking is carried out with photoinitiators of mixed radicalic and cationic type.

12. Antinoise and antifragmentation plates based on acrylic polymers by using a polymeric continuous film according to claim 11, wherein cationic photoinitiators are selected from triarylsulphonium salts.

13. Antinoise and antifragmentation plates based on acrylic polymers by using a polymeric continuous film according to claim 11, wherein the weight ratio between radicalic/cationic photoinitiator is at least 2/1.

14. Antinoise and antifragmentation plates based on acrylic polymers according to claim 1, wherein the film polymers are in admixture with each other or with other polymers selected from PMMA, MMA/styrene in such ratios as to maintain the transparence and the elongation and modulus properties as defined above.

15. Antinoise and antifragmentation plates based on acrylic polymers according to claim 1, wherein the film adhesion is optionally supported by suitable transparent bonding agents such that the final composite is transparent.

16. Antinoise and antifragmentation plates based on acrylic polymers according to claim 1, wherein the polymers having an acrylic basis are selected from the group consisting of MMA homopolymers, MMA copolymers with other comonomers in concentrations up to 10% by weight, optionally selected from ethyl(meth)acrylate, butyl(meth)acrylate.

17. Antinoise and antifragmentation plates based on acrylic polymers according to claim 1, wherein the film is placed at a distance between 5 and 30% of the total thickness of the plate with respect to the surface opposite to the surface subject to crash.

* * * * *